(12) United States Patent
Oukassi et al.

(10) Patent No.: US 9,243,332 B2
(45) Date of Patent: Jan. 26, 2016

(54) METHOD FOR ELIMINATING METALLIC LITHIUM

(75) Inventors: Sami Oukassi, Saint-Egreve (FR); Lucie Le Van-Jodin, Grenoble (FR); Raphael Salot, Lans-en-Vercors (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 12/818,607

(22) Filed: Jun. 18, 2010

(65) Prior Publication Data

US 2010/0326814 A1    Dec. 30, 2010

(30) Foreign Application Priority Data

Jun. 24, 2009  (FR) ...................................... 09 03069

(51) Int. Cl.
 *B01J 19/08* (2006.01)
 *C23F 4/00* (2006.01)
 *H01M 10/052* (2010.01)
 *H01M 10/058* (2010.01)

(52) U.S. Cl.
 CPC ................ *C23F 4/00* (2013.01); *H01M 10/052* (2013.01); *H01M 10/058* (2013.01); *Y02E 60/122* (2013.01)

(58) Field of Classification Search
 CPC ..... C23F 4/00; H01M 10/052; H01M 10/058; Y02E 60/122; B08B 7/04; B08B 3/08
 USPC ....................... 134/1.1; 204/157.44
 See application file for complete search history.

(56) References Cited

U.S. PATENT DOCUMENTS

| 5,705,443 | A | 1/1998 | Stauf et al. |
| 6,121,161 | A | 9/2000 | Rossman et al. |
| 6,207,326 | B1 | 3/2001 | Kawakami et al. |
| 2002/0012846 | A1* | 1/2002 | Skotheim ............ H01M 2/1673 429/231.95 |
| 2005/0003277 | A1* | 1/2005 | Lee ......................... H01M 4/13 429/322 |
| 2005/0079418 | A1 | 4/2005 | Kelley et al. |
| 2005/0186469 | A1* | 8/2005 | De Jonghe et al. ........... 429/137 |
| 2005/0236374 | A1* | 10/2005 | Blankenship ............. 219/121.11 |
| 2006/0196525 | A1 | 9/2006 | Vrtis et al. |
| 2007/0187627 | A1* | 8/2007 | Ershov ................... B82Y 10/00 250/504 R |
| 2007/0295935 | A1* | 12/2007 | Kasama ................. B82Y 30/00 252/182.32 |
| 2009/0293909 | A1* | 12/2009 | Bangert ................ C23C 14/564 134/4 |
| 2010/0085816 | A1 | 4/2010 | Kim |

FOREIGN PATENT DOCUMENTS

| EP | 0 715 366 A1 | 6/1996 |
| EP | 1 845 065 A2 | 10/2007 |
| JP | A-62-250645 | 10/1987 |

OTHER PUBLICATIONS

H. Hu et al., "Etching of lithium niobate: micro- and nanometer structures for integrated optics," Germany.
M. J. Neumann et al., "Plasma cleaning of lithium off of collector optics material for use in extreme ultraviolet lithography applications," *J. Micro/Nanolith.*, vol. 6, No. 2, Apr.-Jun. 2007.
T.E. Evans et al., "Experimental observations of lithium as a plasma-facing surface in the DIII-D tokamak divertor," *Fusion Engineering and Design*, vol. 72, 2004, pp. 133-147, Elsevier.

* cited by examiner

*Primary Examiner* — Michael Kornakov
*Assistant Examiner* — Katelyn Whatley
(74) *Attorney, Agent, or Firm* — Oliff PLC

(57) ABSTRACT

The method for eliminating metallic lithium on a support comprises a plasma application step. The plasma is formed from a carbon source and an oxygen source with a power comprised between 50 and 400 W. It transforms the metallic lithium into lithium carbonate. The method then comprises a dissolution step of the lithium carbonate in an aqueous solution.

10 Claims, No Drawings

METHOD FOR ELIMINATING METALLIC LITHIUM

BACKGROUND OF THE INVENTION

The invention relates to a method for eliminating metallic lithium on a support, comprising a plasma application step.

STATE OF THE ART

A commonly used technique for fabrication of microbatteries consists in successively depositing the thin layers of the microbattery by vacuum deposition techniques, for example PVD (Physical Vapor Deposition), through mechanical masks presenting recesses. The mask is placed on the substrate and held in position throughout deposition. After deposition, the mechanical mask is removed and the substrate presents the desired patterns. This step is repeated as many times as necessary to form the final thin-film device.

The use of such a technique requires strict control of mask maintenance protocols and in particular of the cleaning step. Optimization of this step respects certain criteria, in particular of not damaging the masks and of process yield and time. In the case of fabrication of lithium microbatteries, another safety-related criterion can be added to the foregoing. Cleaning applies to the masks presenting metallic lithium on their surface, a material that is very unstable in contact with air and moisture. The reactivity of the lithium layer is proportional to the quantity present on the mask, a quantity that is all the greater the higher the production rate. Cleaning of this mask with water constitutes a considerable risk in terms of safety on account of the instability of lithium in the presence of moisture.

European Patent application EP1845065 describes a method for obtaining a lithiated or super-lithiated transition metal oxide. It comprises a step of dissolution of a film of metallic lithium in a heavy alcohol-based solution. For example purposes, dissolution of 3 g of lithium metallic is performed in a pentylaldehyde solution at ambient temperature, the reaction being total after two hours. This method presents the following drawbacks: transfer of the metallic lithium from the deposition equipment to the dissolution bath gives rise to a risk of contact between the lithium and air, and the time required to perform such a process is relatively long. This method is moreover ponderous to implement and is not suitable for cleaning a mask.

The article "Plasma cleaning of lithium off of collector optics material for use in extreme ultraviolet lithography applications" (J. Micro/Nanolith. MEMS MOEMS 6(2), 023005, 2007) describes a method for cleaning lithium on optic collectors by application of a helium-based plasma. The plasma is generated from helium by a device comprising a 13.56 MHz radiofrequency power supply. The helium plasma is used to spray the lithium present at the surface of optic mirrors used in extreme ultraviolet lithography. A metallic lithium layer of small thickness on a glass substrate is thereby removed by application of a radiofrequency plasma at a temperature of 400° C. This method is however slow and is not suitable for all lithium layer thicknesses.

OBJECT OF THE INVENTION

The object of the invention is to provide a method for removing metallic lithium remedying the shortcomings of the prior art. More particularly, the object of the invention is to provide a method for removal that is easy to implement, simple to use and quick.

According to the invention, this object is achieved by the fact that the plasma is formed from a carbon source and an oxygen source and transforms the lithium into lithium carbonate and that the method comprises a dissolution step of the lithium carbonate in water.

DESCRIPTION OF PARTICULAR EMBODIMENTS

The method consists in applying a plasma that will react chemically with metallic lithium arranged on a support. The lithium is then transformed into a compound that is stable in air and easy to eliminate, preferably by dissolving it in water.

Application of the plasma on a support containing metallic lithium at the surface can take place in a similar chamber to those of the Plasma Enhanced Chemical Vapor Deposition (PECVD) equipment. Reactive gases containing chemical species are used and injected into such a device. The device generally comprises an AC supply source of radiofrequency type that creates an electromagnetic field. This field ionizes a part of the atoms of the chemical species present in the gases thus creating a plasma. The plasma is formed from a carbon source and an oxygen source. The carbon source is preferably carbon dioxide ($CO_2$). It can also be a compound of formula $C_xH_y$ with $x \geq 1$ and $y \geq 1$, $C_2H_2$ for example. The oxygen source is preferably water ($H_2O$) or diatomic oxygen ($O_2$).

When dioxygen and carbon dioxide are used, the chemical reaction of the plasma with the metallic lithium takes place according to the following two reactions:

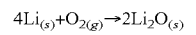

The solid lithium reacts in a first stage with the gaseous dioxygen to form a solid lithium oxide $Li_2O$. In a second stage, the solid lithium oxide $Li_2O$ reacts with the gaseous carbon dioxide to form solid lithium carbonate $Li_2CO_3$.

The $Li_2CO_3$ film obtained at the outcome from these reactions is then dissolved in an aqueous bath. The dissolution step highlights the almost total absence of gas release characteristic of the reactivity of lithium with water. As the reactions are almost total, the quantity of metallic lithium that did not react is minimal.

Heating can be applied to the support to enhance the kinetics of the reactions involved. The support is therefore preferably heated to a temperature comprised between 20 and 200° C.

The plasma application step, also called stabilization step, is performed for example at a pressure of about 233 mTorr at a temperature of 100° C. for 20 minutes. The gas flowrates are about 1.1 standard liter per minute (SLM) for carbon dioxide and about 5 standard liters per minute for dioxygen. The plasma is produced by means of an AC signal of radiofrequency type and the resulting power applied is preferably comprised between 50 W and 400 W. The plasma can also be of low-frequency, continuous or pulsed-continuous type.

For example purposes, this method was used to eliminate a lithium layer with a thickness of 3 μm on a Si/$SiO_2$(1000 Å)/$Si_3N_4$ (3000 Å) substrate.

The method thereby enables the metallic lithium to be transformed into lithium carbonate $Li_2CO_3$, which is a solid compound that is stable in air and in water. The absence of transfer of the masks between the deposition equipment and the cleaning equipment reduces the risks of reaction of the lithium with the atmosphere. Safety requirements are therefore respected.

Furthermore, the reaction kinetics are high enabling a fast process, thereby promoting a high throughput rate.

The method applies to elimination of lithium in various applications. It is of particular interest for cleaning a support forming a mechanical mask used for fabrication of lithium microbatteries. Given the nature of the reactive gases and the materials of the masks, the method does not damage the mechanical masks. The method can also be applied to cleaning lithium deposition chambers.

Finally, the method generates lithium carbonate $Li_2CO_3$ in aqueous solution which can be recycled for subsequent use.

The invention claimed is:

1. A method for removing metallic lithium from a support, comprising the following steps:
    applying a plasma to an environment consisting of carbon dioxide and diatomic oxygen, which
        transforms metallic lithium on a surface of the support into solid lithium oxide $Li_2O$ in a first stage, and
        transforms the solid lithium oxide $Li_2O$ into lithium carbonate in a second stage; and
    dissolving the lithium carbonate in an aqueous solution.

2. The method removing metallic lithium according to claim 1, wherein application of the plasma is performed at a power comprised between 50 W and 400 W.

3. The method for removing metallic lithium according to claim 1, wherein the support is heated to a temperature comprised between 20 and 200° C.

4. The method for removing metallic lithium according to claim 1, wherein the support is a mechanical mask used in fabrication of lithium batteries.

5. The method for removing metallic lithium according to claim 1, wherein in the plasma application step a flow rate of the oxygen is greater than a flow rate of the carbon dioxide.

6. A method for removing metallic lithium from a support, comprising the following steps:
    applying a plasma to an environment consisting of carbon dioxide and diatomic oxygen, which
        transforms a metallic lithium layer on the support into solid lithium oxide $Li_2O$ in a first stage, and
        transforms the solid lithium oxide $Li_2O$ into a lithium carbonate film in a second stage; and
    dissolving the lithium carbonate film in water.

7. The method for removing metallic lithium according to claim 6, wherein application of the plasma is performed at a power comprised between 50 W and 400 W.

8. The method for removing metallic lithium according to claim 6, wherein the support is heated to a temperature comprised between 20 and 200° C.

9. The method for removing metallic lithium according to claim 6, wherein the support is a mechanical mask used in fabrication of lithium batteries.

10. The method for removing metallic lithium according to claim 6, wherein in the plasma application step a flow rate of the oxygen is greater than a flow rate of carbon dioxide.

* * * * *